Aug. 31, 1965   O. J. B. ORWIN   3,203,524
OVERLOAD OR TORQUE LIMITING CLUTCHES
Filed July 12, 1963   8 Sheets-Sheet 1

INVENTOR.
OLAF JOHN BARCLAY ORWIN
By
Kurt Kelman
AGENT

Aug. 31, 1965   O. J. B. ORWIN   3,203,524
OVERLOAD OR TORQUE LIMITING CLUTCHES
Filed July 12, 1963   8 Sheets-Sheet 2

INVENTOR.
OLAF JOHN BARCLAY ORWIN
By Kurt Kelman
agent

INVENTOR.
OLAF JOHN BARCLAY ORWIN
By Kurt Kelman
AGENT

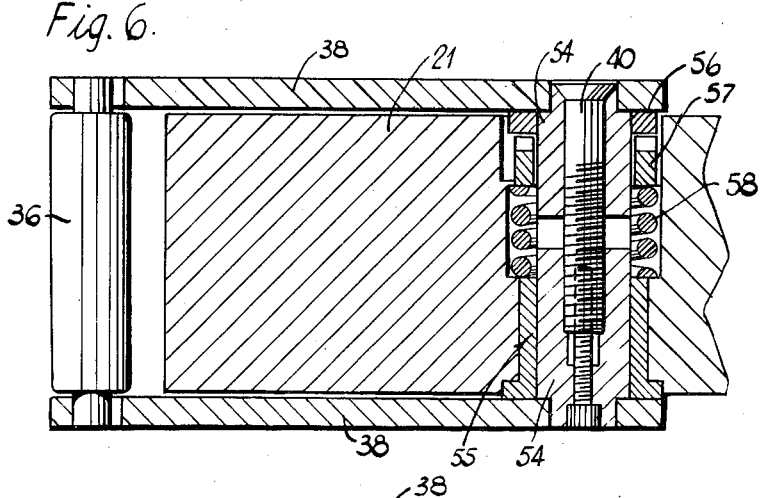
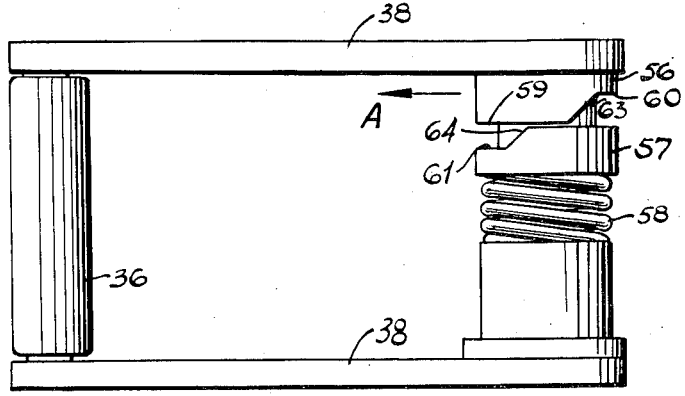
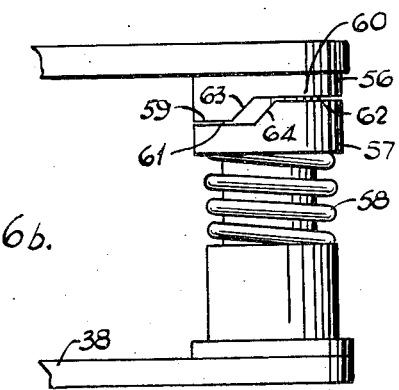

Aug. 31, 1965     O. J. B. ORWIN     3,203,524
OVERLOAD OR TORQUE LIMITING CLUTCHES
Filed July 12, 1963                8 Sheets-Sheet 5

INVENTOR.
OLAF JOHN BARCLAY ORWIN
By Kurt Kelman
AGENT

Aug. 31, 1965  O. J. B. ORWIN  3,203,524
OVERLOAD OR TORQUE LIMITING CLUTCHES
Filed July 12, 1963  8 Sheets-Sheet 6

INVENTOR.
OLAF JOHN BARCLAY ORWIN
By Kurt Kelman
AGENT

Aug. 31, 1965     O. J. B. ORWIN     3,203,524
OVERLOAD OR TORQUE LIMITING CLUTCHES

Filed July 12, 1963     8 Sheets-Sheet 8

INVENTOR.
OLAF JOHN BARCLAY ORWIN
BY Kurt Zelma
AGENT

United States Patent Office 3,203,524
Patented Aug. 31, 1965

3,203,524
OVERLOAD OR TORQUE LIMITING CLUTCHES
Olaf John Barclay Orwin, Quinton, Birmingham, England, assignor to Fisher & Ludlow Limited, Tipton, England, a British company
Filed July 12, 1963, Ser. No. 294,684
Claims priority, application Great Britain, July 21, 1962, 28,157/62
13 Claims. (Cl. 192—56)

This invention relates to overload or torque limiting clutches herein referred to as torque limiting clutches and which are of the kind herein referred to as the kind specified, comprising driving and driven clutch elements mounted for rotational movement and each provided respectively with one or more driving and one or more driven torque transmitting abutments, one or more torque transmitting members each adapted for torque transmitting engagement between a driving abutment and a driven abutment, each of said torque transmitting members being of circular form peripherally and being adapted for rolling engagement with said torque transmitting abutments, loading means adapted to maintain the or each torque transmitting member in torque transmitting engagement with said driving and driven abutments, the arrangement being such that on a predetermined torque being exceeded, the driving element together with each of its driving abutments is adapted to turn relative to the driven element and each of its associated driven abutments against the restraining torque provided by the loading means with each torque transmitting member thereupon rolling out of engagement of the driving abutments to permit of the driving element over-running the driven element.

Torque limiting clutches of the kind specified are already known in which the torque transmitting members comprise balls and the driving and driven elements are adapted to move relatively apart in a direction along the axis of rotation of the clutch against spring loading constituting the loading means and one such torque limiting clutch is described in my Patent No. 3,095,955.

Such known form of clutch entails the disadvantages that the torque transmitting members remain in pressure contact with the driving and driven elements of the clutch when the clutch is disengaged so as still to transmit some slight residual torque to the driven element which may still rotate unless held against rotational movement in which case the torque transmitting balls rotate relative to the driving and driven elements so as to permit of the continued rotation of the driving element under the torque applied thereto from the power source.

A further disadvantage of such known form of torque limiting clutch is that unless the overall dimension of the clutch is made so large that the clutch is unwieldly in size, the amount of torque which can be transmitted by the clutch is seriously restricted.

One of the objects of the present invention is to provide a torque limiting clutch of the kind specified which particularly where the torque transmitting members are constructed as rollers as opposed to balls enables a relatively high torque of the order of 10,000 to 50,000 lbs. ins. (11,000 to 57,000 kg. cms.), being transmitted without making the overall size of the clutch so great as to be unwieldy.

The present invention in its broadest aspect provides a torque limiting clutch of the kind specified which is characterised in that the driving and driven elements are arranged concentrically one within the other with their respective torque transmitting abutments on the inner face of the outer member and on the outer face of the inner member, each of the torque trasmitting abutents associated with one of said two clutch elements being mounted upon a carrier, each carrier being adapted to fulcrum on the associated clutch element at a position such that when the clutch is transmitting torque, the resultant line of thrust between the associated torque transmitting abutment and the torque transmitting member passes adjacent to, but to one side of the fulcrum axis such as to tend to displace the carrier and its associated abutment in a direction away from the torque transmitting member against the reaction force provided by said loading means, and each circular torque transmitting member being adapted in torque transmitting position to engage with a driving and a driven abutment at positions respectively on diametrically opposite sides of the axis of rotation of the torque transmitting member.

By mounting each of the torque transmitting abutments of one of the two clutch elements upon a carrier which is adapted to fulcrum on the associated clutch elements at a position such that the aforementioned line of thrust passes adjacent to the fulcrum of said carrier, the moment or couple applied to each carrier by the thrust between the associated torque transmitting abutment and the torque transmitting member is maintained small in comparison with the torque which is being transmitted by the clutch, and the loading means for retaining each carrier in the operative or torque transmitting position, e.g. a loading spring, may be maintained at a value which is small in comparison with the value of the torque transmitted, thereby permitting of the clutch being formed to compact construction and avoiding the necessity of providing a clutch of such a large overall size as to be unwieldly.

Thus, for a torque of the maximum figure above specified, the overall diameter of the clutch need not exceed about 15 to 18 ins. (38 to 45 cms.) provided that the torque transmitting members are as is preferred constructed as rollers and accordingly arranged to have line as opposed to point contact with the torque transmitting abutments.

By arranging for each circular shaped torque transmitting member to be in torque transmitting engagement with the two abutments at positions on diametrically opposite sides of the axis of rotation of the member, the latter with the clutch engaged is not subjected to any resultant couple tending to roll it about its own axis out of torque transmitting position.

Where maximum torques considerably less than the maximum value above specific are to be transmitted, only one torque transmitting member and one driving and driven torque transmitting abutment may be sufficient, but for larger torques such as those of the values above specified, a plurality of torque transmitting members together with a plurality of corresponding driving and driven abutments would be required spaced around the axis of rotation of the clutch.

A further object of the present invention in its preferred form is to provide a torque limiting clutch of the kind specified in which transmission of residual torque when the clutch is disengaged is entirely avoided and this is done in accordance with a preferred embodiment of this invention by mounting each torque transmitting member upon one of the two elements of the clutch for bodily movement in relation thereto, the arrangement being such that when a predetermined torque is exceeded, each torque transmitting member moves bodily relative to the one element on which it is mounted into an inoperative position in which it is maintained out of engagement with each abutment on the other of the two clutch elements despite continued rotation of the driving element of the clutch element.

In accordance with a further important feature of this invention the carrier on which each torque transmitting abutment of one clutch element is mounted may be provided with a pair of fulcrum portions spaced circumferentially in relation to the axis of rotation of the clutch, one or the other of which fulcrum portions is operative, i.e. adapted for fulcruming engagement with the associated clutch element according to the direction of rotation of the clutch with the aforementioned line of thrust passing adjacent said operative fulcrum portion, the arrangement thereby permitting of the same construction of clutch being operated in either direction as desired.

The invention is illustrated in the accompanying drawings wherein:

FIGURE 6 is a sectional view on an enlarged scale on the line 6—6 of FIGURE 2, illustrating the mounting of one of the torque transmitting members of the clutch.

FIGURES 6a and 6b are elevational views of certain of the parts depicted in FIGURE 6 and showing respectively the relative position of these parts with the clutch in the engaged and fully disengaged position.

Figure 1:
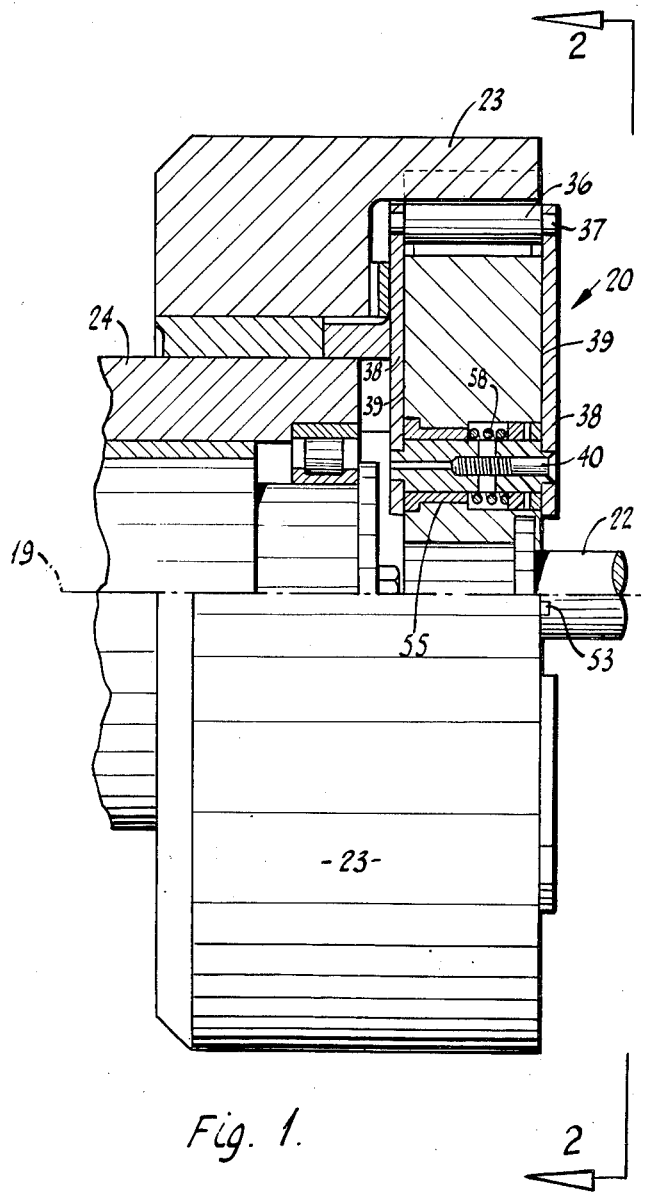
FIGURE 1 is a part sectional side elevation of one form of torque limiting clutch in accordance with this invention.

Referring firstly to the construction illustrated in FIGURES 1 to 6b of the drawings, the torque limiting clutch depicted generally at 20 in FIGURE 1 comprises a driving element 21 of disc-like generally circular configuration and connected to a driving shaft 22 concentric with the center of the cylindrical element 21, the clutch further comprising a driven element 23 of cylindrical form which extends around the driving element 21, the driven element 23 being connected to driven boss 24 aligned with driving shaft 22, so that the shaft and boss are adapted to rotate about a common axis 19 constituting the clutch axis.

The inner disc-like driving element 21 is provided with a number, for instance as shown, three torque transmitting driving abutments 25 spaced equidistantly around the periphery of the driving element 21.

Each of these driving abutments 25 is formed as a length of cylindrical bar, housed within a correspondingly shaped recess provided in driving abutment carrier 26 so that the central axis of each of these cylindrical bars 25 extends parallel to the axis of rotation 19 of the clutch 20, and the arangement is such that each driving abutment 25 presents an abutment face 27 of convex i.e. part circular configuration with the axis of curvature parallel to the axis 19 of the clutch.

Each driving abutment carrier 26 extends in a direction generally tangentially of the periphery of the driving element 21 and is housed within a corresponding recess 28 formed in the periphery of the driving element 21.

Figure 2:
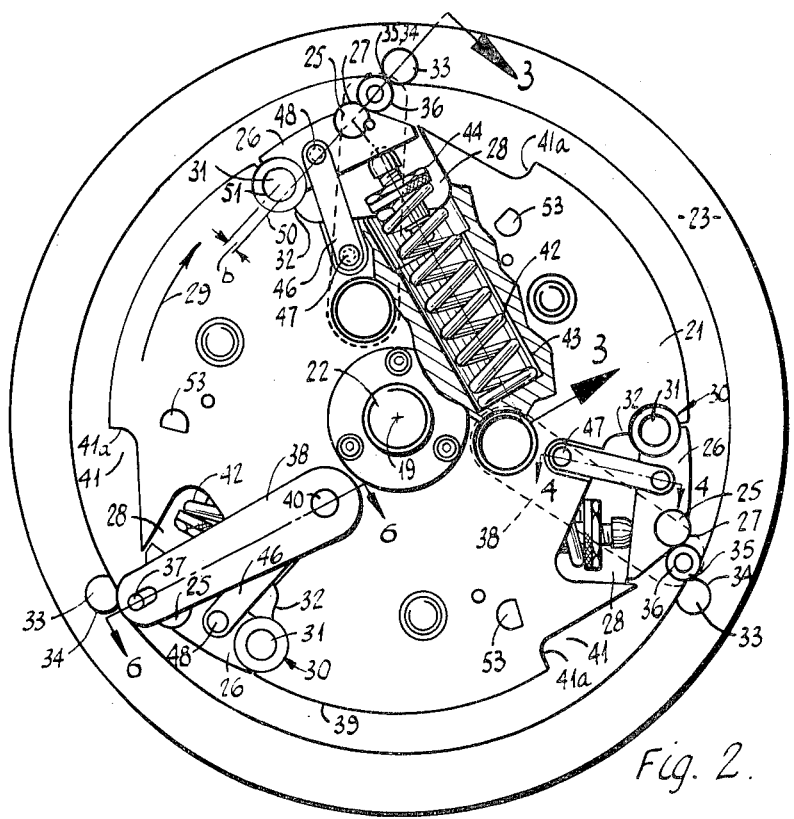
FIGURE 2 is an elevational view, with certain parts broken away, taken on the line 2—2 of FIGURE 1, the parts being depicted with the clutch in the engaged position.

The designed direction of rotation of the clutch is clockwise as viewed in FIGURE 2 i.e. as denoted by the arrow 29 in this figure and at a position spaced angularly rearwardly (for this direction of rotation) of the corresponding driving abutment 25, each carrier 26 is provided with a fulcrum portion 30, which through fulcrum pin 31 is adapted to fulcrum or pivot in relation to the adjacent edge portion 32 of the carrier recess 28, that is to say in relation to that edge portion 32 of the recess 28 which is rearmost for the aforementioned direction of rotation.

The cylindrical driven element 23 on the inner side thereof is provided with a number of torque transmitting driven abutments 33 corresponding in number and spacing to the driving abutments 25 and formed similarly from a length of cylindrical bar housed within a correspondingly shaped recess 34 formed in the driven element 23 so that the central axis of each cylindrical bar 33 extends parallel to the axis of rotation of the clutch. Each driven abutment 33 projects inwardly of the inner surface of the driven element 23 to the extent of providing a driven abutment surface 35 of part circular, i.e. convex form in configuration, with its axis of curvature parallel to the axis of curvature of driving abutment surface 27.

The driving element 21 is provided with a number of torque transmitting members 36 each constructed as a roller, there being the same number of torque transmitting rollers as there are driving or driven abutments.

Accordingly in the clutch engaged position depicted in FIGURE 2 a torque transmitting roller 36 is adapted to be disposed between one of the driving abutments 25 and one of the driven abutments 33.

Each roller 36 has a diameter which is greater than the distance between the opposed faces of any two abutments 25, 33, considering the central axes of these two cylindrical shaped abutments lying in a common plane extending radially in relation to the axis of rotation 19 of the clutch. Accordingly each torque transmitting roller 36 is capable as shown in FIGURE 2 of being disposed in a torque transmitting position in which it is in pressure engagement with both a driving abutment 25 and a driven abutment 33, and is thus adapted to transmit torque from the driving element 21 to the driven element 23.

Figure 5:
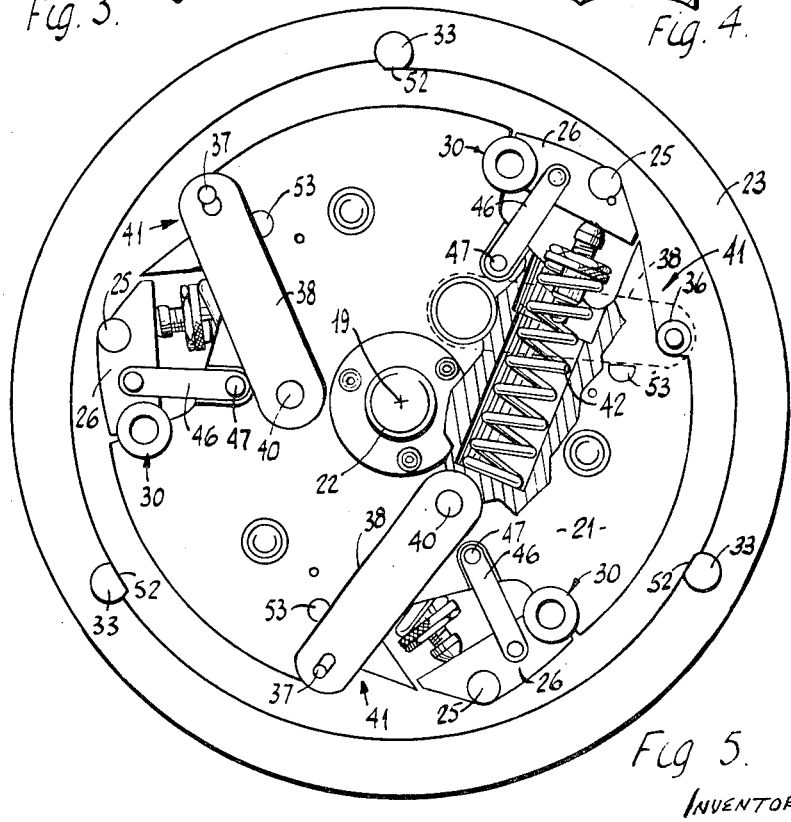
FIGURE 5 is a view similar to FIGURE 2 but showing the position of the parts when the clutch is fully disengaged.

The abutments 25, 33 are so housed in their respective recesses in carrier 26 and driven element 23 as to be incapable of rotating about their own axes relative to the parts on which they are mounted, but the rollers 36 are mounted for free rotational movement on supporting spindles 37 the ends of which are mounted upon the outer end of a pair of arms 38 (see FIGURE 3) constituting a roller carrier, which arms extend adjacent the end faces 39 of the driving element 21 to which their inner ends are pivoted by pivot pins 40, the arrangement being such that each roller 36 is free to swing bodily about an axis parallel to the clutch axis 19 from the operative position depicted in FIGURE 2 into the inoperative position depicted in FIGURE 5 in which each roller 36 is received within a roller receiving recess 41 provided in the periphery of the driving element 21.

As will readily be seen from a comparison between FIGURE 2 and FIGURE 5 when the roller 36 is in the inoperative position depicted in FIGURE 5 its radial distance from the clutch axis 19 is less than when the roller is in its operative position, and each roller in the inoperative or clutch disengaged position depicted in FIGURE 5 is in a position in which it is spaced inwardly in relation to the adjacent inner surface of driven abutment 33. Accordingly if in the clutch disengaged position depicted in FIGURE 5 the driving element 21 continues to rotate there is no danger of the rollers 36 engaging with the driving abutments 33 or with any other part of the interior of the driven element 23. Thus transmission of residual torque to the driven element 23 is completely avoided with the clutch in the disengaged position.

Figure 2A:
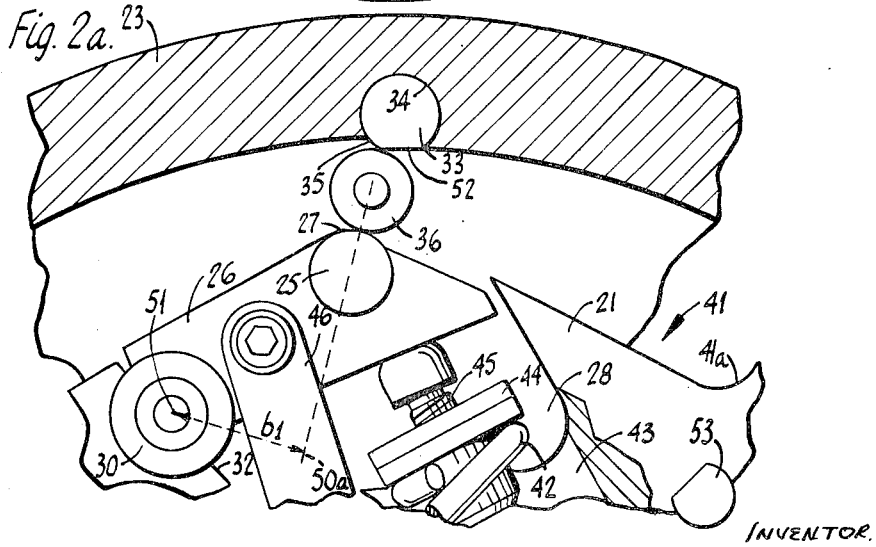
FIGURE 2a is an elevational view on an enlarged scale of a portion of the construction shown in FIGURE 2 showing the relative position of certain of the parts as the clutch just commences to disengage.
Figures 3, 4:
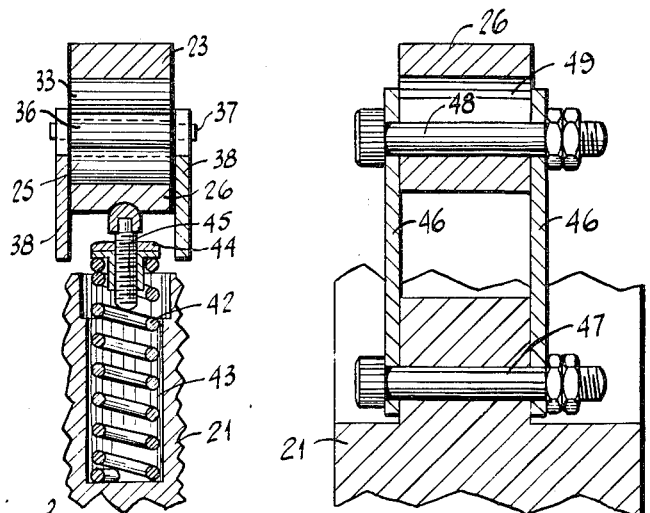
FIGURE 3 is a section view on the line 3—3 of FIGURE 2.
FIGURE 4 is a detailed sectional view on the line 4—4 of FIGURE 2.

The driving abutment carriers 26 are urged outwardly about their fulcrum pins 31 into position for pressure contact with the rollers 36 by loading springs 42 each of helically coiled compression type, each spring being contained within a housing 43 formed in the driving element 21, the outer end of each spring engaging a nut 44 in which is threadably and thus adjustably mounted a thrust pin 45, the outer end of which bears against the adjacent face of the carrier 26, the arrangement being clearly shown in FIGURES 2a and 3. Outward movement of each carrier 26 under the pressure of its associated spring 42 is limited by a pair of links 46 which at one end namely their inner ends, are pivoted at 47 to the driving element 21 the outer ends of the links being joined by a pin 48 which extends as shown in FIGURE 4 through a hole 49 of enlarged form in cross section which provides for the required pivotal movement of each carrier 26 relative to the pin 48.

Considering the clutch with the parts in the engaged position depicted in FIGURE 2 with the driving element 21 rotating in the direction of arrow 29, each driving abutment 25 will transmit pressure through its convex face 27 to the adjacent torque transmitting roller 36 and from the latter to the convex face 35 of the adjacent engaged driven element abutment 33 and in this clutch engaged position the central axis i.e. the axis of rotation of roller 36 and the axis of curvature of the driving and driven abutment faces 27, 35, are all disposed in a common plane 50 in FIGURE 2 and each roller 36 makes line engagement with the convex faces 27, 35 in this common plane, or virtual line engagement in such plane, allowing for inevitable slight resilient deformation under load of the surfaces, and the line of thrust between each roller 36 and its engaged abutments 25 and 33 will in each case be disposed in plane 50.

The arrangement is accordingly such that with the parts of the clutch in the engaged position as depicted in FIGURE 2, the resultant reaction force between each pair of abutments 25, 33, and the roller 36 therebetween passes through the axis of rotation of the roller and does not of itself apply to the roller 36 any force tending to displace the roller 36 with its associated carrier 38 in a circumferential direction out of the clutch engaged position.

As shown in FIGURE 2, the plane 50 containing the aforementioned force reaction including the reaction force of roller 36 on adjacent abutment 25 passes near to the central axis 51 of fulcrum pin 31 constituting the axis of fulcruming of driving abutment carrier 26, extending past such axis on the side thereof which is nearest to the clutch axis 19. Accordingly the reaction force from roller 36 on each driving abutment 25 applies to carrier 26 a couple tending to displace this towards the clutch axis, i.e. in a clockwise direction about its fulcrum axis 51. Insofar as the aforementioned reaction force plane 50 passes close to such axis 51, the beam length $b$ of such couple is small, being in practice of the order of $\frac{1}{16}$ to $\frac{5}{16}$ in. Accordingly although the reaction force itself may be very high the resultant couple tending to displace each carrier 26 inwardly can readily be resisted by a conventional helically coiled spring of wire diameter of the order of $\frac{1}{4}$ in. and overall diameter of the order of 1 in. acting on the carrier 26 at a distance or beam length from axis 51 considerably greater than distance $b$.

The arrangement accordingly permits of the clutch transmitting considerable torques of the value above specified without it being necessary to provide abnormally large loading springs or other excessively large loading means for each carrier 26 and thus permits of the overall diameter of the clutch being kept within convenient limits as above stated.

From the foregoing description it will be understood that as soon as the clockwise couple produced by the reaction of each roller 36 on each driving abutment 25 exceeds the anti-clockwise couple produced by the loading of each spring 42 on the associated carrier 26, the latter will commence to swing inwardly through the clutch disengaging position depicted in FIGURE 2a in which the plane of the thrust reaction of roller 36 on abutment 25 here depicted at 50a is now disposed at a considerably greater distance $b1$ from carrier pivot axis 51 so that the carrier 26 is subjected to a progressively and rapidly increasing couple tending to displace this inwardly, and displacement of each carrier 26 and consequent disengagement of the clutch proceeds in an extremely rapid manner with the driving element 21 now commencing to overrun the driven element 23 and each driving abutment 25 and its associated roller 36 now moving forwardly in relation to the corresponding driven abutment 33, so that the rollers 36 commence to disengage from the driven abutments 33.

Such disengagement of the rollers 36 from abutments 33 is assisted by chamfering or relieving that face 52 of each driven abutment 33 which is situated forwardly of the roller engaging face 35 as clearly shown in FIGURE 2a.

As soon as the rollers 36 move forwardly beyond that surface of each abutment 33 which is nearest to clutch axis 19, the rollers 36 will be subjected to a forwardly directed reaction thrust from driven abutment surfaces 52 and from the still engaged and outwardly spring loaded driving abutments 25. As a result, the rollers 36 together with their associated carrier arms 38 are suddenly and forcibly thrust forwardly relative to the driving element 21.

Such sudden forward movement of the roller carrying arms 38 is limited by the engagement of each roller 36 with the forward edge 41a of each roller receiving recess 41, as well as by the simultaneous engagement of each arm 38 with a corresponding stop pin 53.

Hard impact of each roller 36 against such recess edge 41a and of each arm 38 against pin 53, with corresponding damage to the parts is avoided by incorporating in the pivotal mounting for the roller carrier arms 38 a retarding device. As best shown in FIGURES 6 and 6a the pivot bearing 40 for each pair of roller carrier arms 38 comprises an inner sleeve 54 which connects together the inner ends of the two arms, each sleeve 54 being disposed within a bore 55 extending axially through the driving element 21. Surrounding one end portion of each sleeve 54 are two axially aligned annular cam members 56, 57, housed within bore 55. Cam member 56 is secured to sleeve 54 so as to turn with the carrier arms 38. Cam member 57 is axially slidable within bore 55 and is displaced towards cam member 56 under the pressure of helically coiled pressure spring 58 which surrounds the medial part of sleeve 54. Cam member 57 is of non-circular form peripherally so as to be non-rotatable within bore 55.

As shown in FIGURE 6a the cam members 56, 57 are each formed with two end faces 59, 60 in the case of cam member 56, and 61, 62, in the case of cam member 57, the two end faces of each cam member being disposed in planes perpendicular to the axis of pivoting of carrier arms 38 and being spaced relatively in an axial sense along such axis of pivoting, i.e. along pivot bearing 40.

The two end faces 59, 60, and 61, 62, are respectively joined by cam faces 63, 64, which extend at an inclination to the said axis of pivoting of carrier arms 38.

The arrangement is such that with the torque transmitting rollers 36 in the operative or torque transmitting position depicted in FIGURES 2 and 6, the two cam members 56, 57 are in the relative rotational position depicted in FIGURE 6a in which end face 59 of cam member 56 is in engagement with end face 62 of cam member 57 with the cam faces 63, 64 out of register with one another, in which position spring 58 is heavily compressed so as to urge slidable cam member 57 in a direction towards cam member 56.

When disengagement of the clutch commences and the rollers 36 with their associated arms 38 swing forwardly in a direction towards edge 41a of each roller receiving recess 41, cam member 56 turns relative to cam member 57 in the direction of the arrow A in FIGURE 6a, thus bringing cam face 63 towards the position in which it is axially in register with cam face 64 of cam member 57 until as cam member 56 continues to turn, the two inclined cam faces 63, 64, are brought into register with one another, whereupon cam member 57 will be displaced axially towards cam member 56 under the pressure of spring 58 and into the position depicted in FIGURE 6b in which the two end faces 61, 62, of cam member 57 are in face to face engagement with end faces 59, 60 respectively, of cam member 56. Such end face engagement is a pressure engagement because spring 58 is so formed as still to apply pressure to cam member 57 when this has been displaced into the position shown in FIGURE 6b.

At the same time by reason of the fact that the two cam faces 63, 64 are in register with one another, cam member 56 together with the roller carrier arms 38, is effectively prevented from turning by more than a small distance in a direction the reverse of that indicated by the arrow A. Some return movement is allowed for so as to permit of some rebound of the rollers 36 from the recess edges 41a and this is taken care of by the fact that when the rollers 36 are in their fully forward position, the two cam faces 63, 64 are spaced out of contact with one another as shown in FIGURE 6b. These two cam faces are inclined to the plane of their adjacent end face at an angle as shown in FIGURES 6a and 6b of the order of 60° so as effectively to retain the parts in the position depicted in FIGURE 6b. Thus once the clutch has disengaged the torque transmitting rollers 36 are effectively held in the disengaged position depicted in FIGURE 5 fully clear of the driven element abutments 33 despite continued rotation of the driving element 21.

As soon as each of the rollers 36 has swung forwardly clear of each driving element abutment 25, the latter with their associated carriers 26 again move outwardly under the pressure of their associated loading springs 42 as shown in FIGURE 5.

Re-engagement of the clutch when the driving element has been brought to rest is effected by manually turning the carrier arms 38 back into the operative position as depicted in FIGURE 2, thus turning each cam member 56 relative to cam member 57 into the position depicted in FIGURE 6a in which end face 59 of cam member 56 is again in pressure engagement with end face 62 of cam member 57 such pressure engagement being provided by spring 58 whereby the rollers 36 are effectively retained in their operative position. The inclination of cam faces 63, 64 at the angle aforementioned is not so steep as to preclude this manual turning of carrier arms 38. Finally the driving and driven elements 21, 23 are turned relatively until all of the parts again occupy the position depicted in FIGURE 2.

In the alternative construction depicted in FIGURES 7 to 11 of the drawings, the clutch 20 there depicted is intended to transmit appreciably lower torques than is the case with the construction above described and the driving and driven elements 21, 23 are each provided with only a single torque transmitting abutment 25, 33, respectively, again constructed as a length of round section bar having its central axis parallel to the clutch axis 19, the respective bars being mounted in such a manner that they are incapable of rotating about their own axes. In association with this one driving abutment and this one driven abutment is a single torque transmitting member 36 which is again constructed as a roller having its axis extending parallel to the axes of the two abutments 25, 33.

Figure 8A:
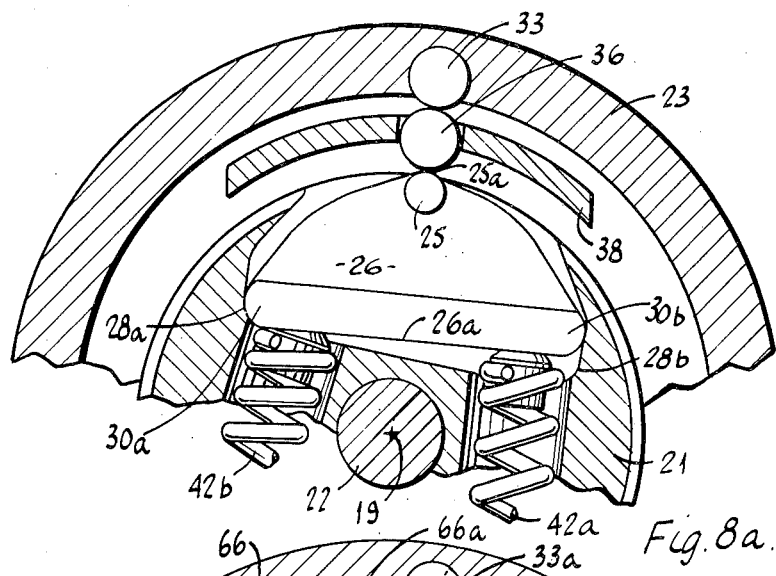
FIGURE 8a is a view similar to FIGURE 8 showing the position of the parts with the clutch at the instant of disengagement.
Figure 8:
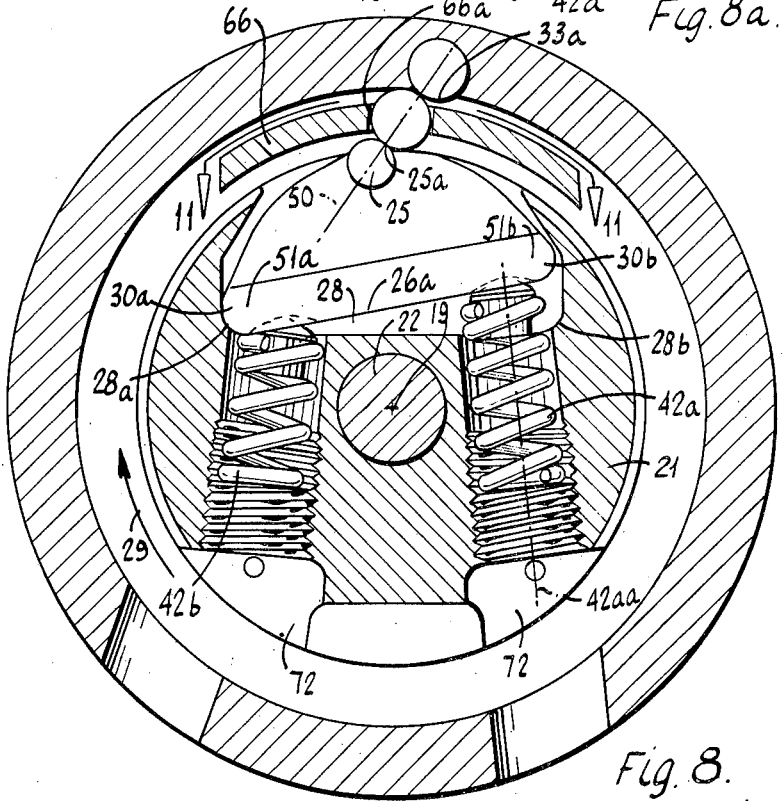
FIGURE 8 is a sectional view on the line 8—8 of FIGURE 7, the parts being depicted in the clutch engaged position.

The driving element abutment 25 is again mounted on a carrier 26, the carrier being of generally triangular form in cross section as viewed in FIGURE 8 looking along the axis 19 of the clutch with the driving abutment 25 being disposed adjacent the apex of the triangle. This carrier 26 is provided with two fulcrum portions 30a, 30b, constituted by the two corners at opposite ends of the base 26a of the triangular shaped carrier and the latter is housed within a recess 28 formed at one side of the driving element 21. Such recess is of generally channel form in cross section so as to embody adjacent its base, two corner portions 28a, and 28b, which extend parallel to the clutch axis 19, each corner portion being of concave, i.e. part circular form in cross section as clearly shown in FIGURE 8.

Each corner portion 28a, 28b, is adapted for fulcrum engagement with the corresponding fulcrum portion 30a, 30b, respectively, of carrier 26 which fulcrum portions are of convex form in cross section in conformity with the configuration of corner portions 28a, 28b.

Figure 10:
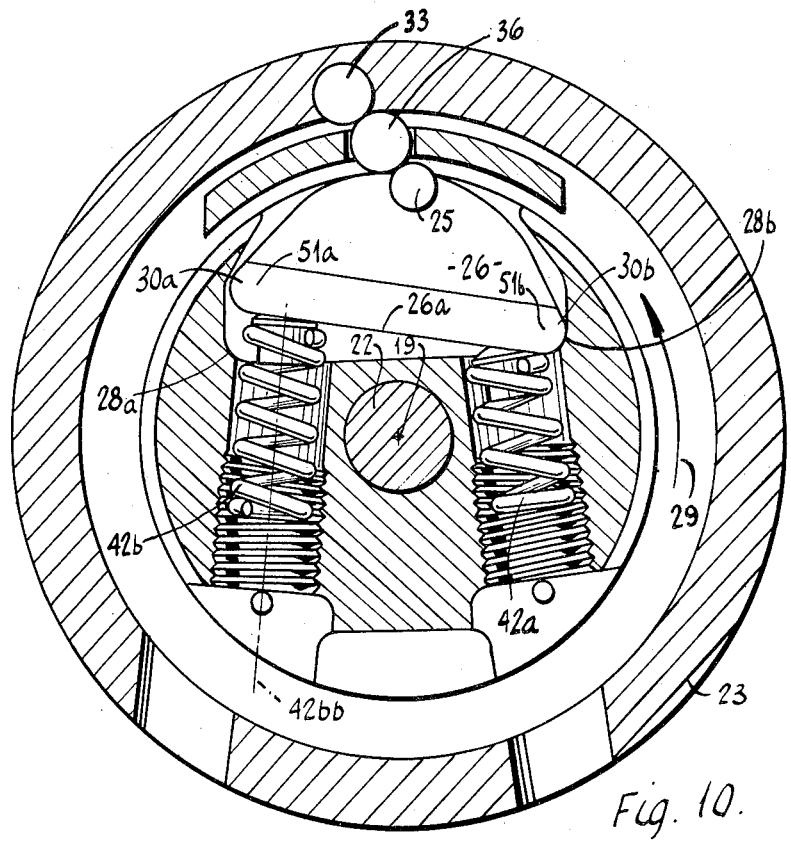
FIGURE 10 is a view similar to FIGURE 8 showing the position of the parts with the direction of rotation of the clutch reversed from the direction depicted in FIGURE 8.

The arrangement is such that having regard to the fact that as shown the inner element namely 21, is again the driving element of the clutch, the driving element abutment 25 is in the direction of clutch rotation as depicted by arrow 29 in FIGURE 8 situated rearwardly in relation to the driven element abutment 33 and the same condition obtains if as shown by arrow 29 in FIGURE 10 the direction of rotation of the clutch is reversed from the clockwise direction of FIGURE 8 to the anti-clockwise direction shown in FIGURE 10.

Accordingly that fulcrum portion 30a, 30b which is situated rearwardly in the direction of clutch rotation of driving abutment 25 is adapted for fulcrum engagement with the corresponding corner portion 28a, 28b of driving element 21, i.e. for the clockwise direction of rotation in FIGURE 8 fulcrum portion 30a, is operative, and for the anti-clockwise direction of rotation depicted in FIGURE 10 fulcrum portion 30b, is operative.

Figure 7:
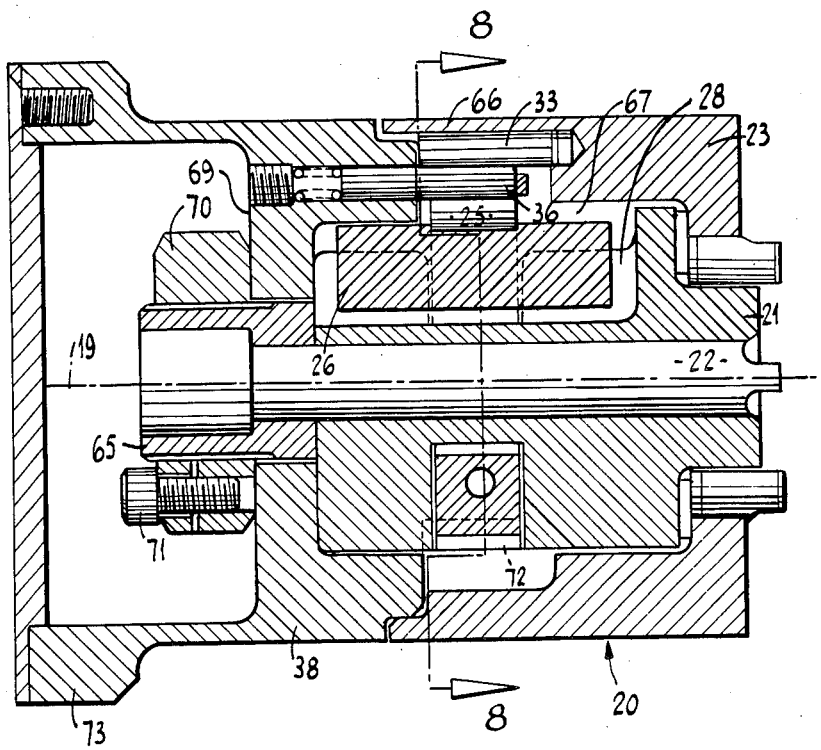
FIGURE 7 is a cross sectional view of a further form of torque limiting clutch embodying this invention.

As already explained in connection with the construction depicted in FIGURES 1 to 6b, the arrangement is such that with the clutch in the engaged position the central axes of the two cylindrical shaped abutments 25, 33, together with the central axis of roller 36 all lie in a common plane 50 which is the plane of the thrust reaction of abutment 33 on roller 36 as well as the thrust reaction of roller 36 on abutment 25, considering the clutch transmitting torque and the arrangement is such that this thrust plane passes near to the fulcrum portion 30a or 30b as shown in FIGURES 7 and 10 respectively, but adjacent to, i.e. slightly to one side of, namely on the clutch axis side of, the axis of fulcruming 51a, 51b respectively so as to permit of the carrier 26 pivoting inwardly of element 21 about its operative fulcrum portion.

Such inward movement of the carrier is resisted by loading means comprising in this case a pair of loading springs 42a, 42b, each housed within the driving element 21.

Each spring is disposed adjacent one of the two fulcrum portions and is adapted for thrust engagement with the adjacent part of the base 26a of carrier 26. The line of thrust 42aa and 42bb, of springs 42a and 42b respectively, extending at the position of engagement of each such spring, with base 26a, radially in relation to the axis of fulcruming 51a, 51b, of the corresponding fulcrum portion 30a and 30b as shown in FIGURES 8 and 10 respectively.

With such an arrangement insofar as spring 42a is disposed adjacent fulcrum portion 30b and spring 42b is disposed adjacent fulcrum portion 30a, it will be understood that only one or the other of the two springs, namely 42a or 42b will be effective according to whether the fulcrum portion 30a or fulcrum portion 30b of the carrier is operative and the arrangement readily permits of the same identical clutch being employed for either direction of rotation.

The torque transmitting roller 36 is mounted upon a carrier 38 which as shown in FIGURE 7 is of annular form and is supported for three rotational movement upon hub 65 carried by the adjacent end of driving shaft 22.

Figure 11:
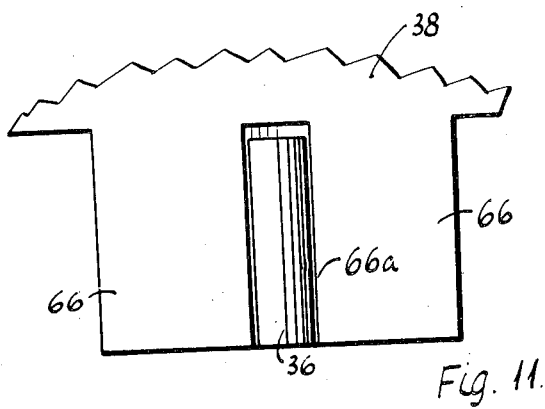
FIGURE 11 is a sectional view on the line 11—11 of FIGURE 8 illustrating the construction of the carrier for the torque transmitting member.

The carrier 38 at one end thereof is provided, see FIGURE 11, with a pair of arms 66 of arcuate form in cross section which extend parallel to clutch axis 19, the arms extending into the annular space 67 between the inner driving element 21 and the outer annular driven element 23. These two arms 66 are spaced circumferentially apart from one another by a distance slightly greater than the diameter of torque transmitting roller 36 so as to provide therebetween an opening 66a of elongated or slot like configuration having its major dimension or length extend parallel to the clutch axis 19 in which slot between the two arms 66 is accommodated the roller 36 as shown in FIGURE 11.

With this particular construction disengagement of the clutch proceeds in manner similar to the construction previously described; the driving element 21 rotating forwardly in relation to the driven element 23, and the driving abutment carrier 26 moving momentarily inwardly of element 21 into the partially disengaged position depicted in FIGURE 8a, in which the centres of the roller 36 and driving and driven abutments all lie on a common plane radially in relation to the clutch axis 19 as shown in FIGURE 8a. The driving element 21 with its associated driven abutment 25 is now quite free to rotate forwardly in relation to the driven element 23 and as torque is still being applied to the driving element and the roller 36 is still in pressure contact with driven abutment 33, the driving abutment 25 will move forwardly relative to the roller 36 into the fully disengaged position depicted in FIGURE 9, thus permitting of the driving abutment carrier 26 moving into the fully projected position depicted in FIGURE 9 under the loading of both of the two springs 42a, 42b in which the distance between the outermost part 25a and the innermost part 33a of abutment 33 is less than half the diameter of roller 36 considering these parts 25a and 33a directly opposite to one another. Accordingly there is no possibility of the roller 36 inadvertently again becoming trapped between the driving and driven element abutments and of the clutch undesirably re-engaging.

Such outward displacement of driving abutment carrier 26 is limited by the engagement of its two fulcrum portions 30a and 30b with the sides 68 of recess 28 which sides near the mouth of the recess are of outwardly mutually convergent configuration.

Figure 9:
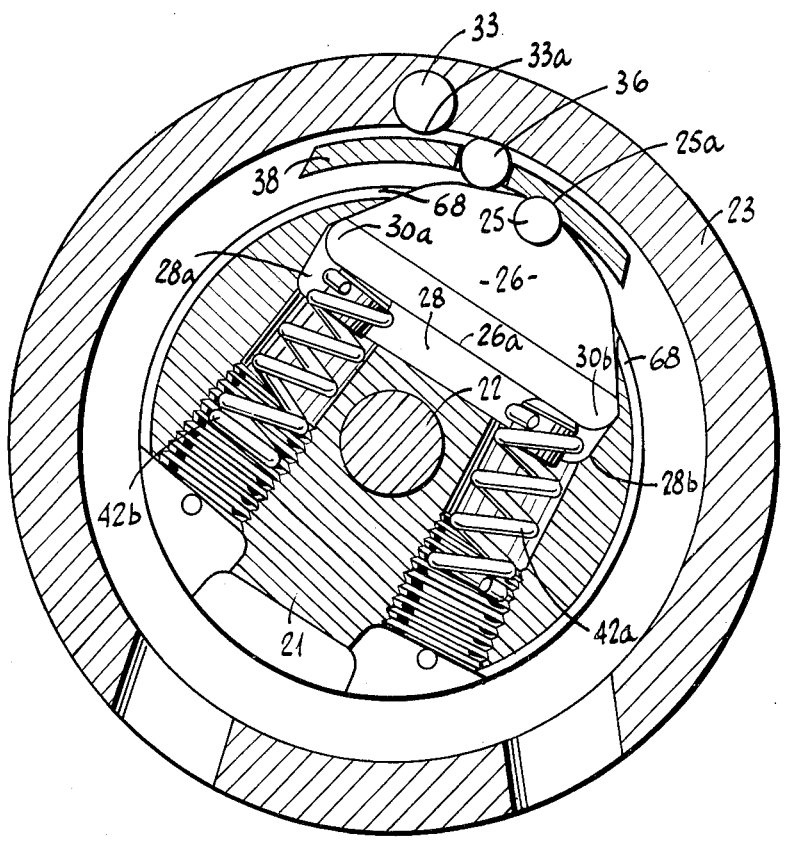
FIGURE 9 is a view similar to FIGURE 8 showing the position of the parts with the clutch fully disengaged.

As soon as the driving abutment 25 has moved forwardly relative to roller 36 towards the position depicted in FIGURE 9, the pressure of roller 36 is relieved and under the momentum possessed by roller carrier 38 and the reaction pressure from driven abutment 33 at the extent of clutch disengagement as already described in connection with the preceding construction, the roller carrier 38 is urged to rotate forwardly relative to the driven element 23. Uncontrolled rotational movement of carrier 38 is precluded by providing a light frictional engagement between end face 69 of carrier 38 and the adjacent end face of retarding nut 70 (see FIGURE 7) which is mounted threadably on the aforementioned hub 65 which is on driving shaft 22 and which accordingly rotates that driving element 21. Such nut 70 by virtue of its threaded mounting on hub 65 can be adjusted so as to vary the frictional pressure on carrier and face 69, the adjustment being controlled by lock screw 71.

The driving element 21 at a position substantially diametrically opposite to the driving abutment 25 is formed peripherally with a pair of axially extending roller receiving recesses 72, and as the driving element 21 continues to rotate relative to the driven element 23 until the driving shaft 22 is stopped by the operator the parts will sooner or later reach a relative rotational position in which one or the other of these two recesses 72 is adjacent to driven abutment 33 at a time when roller 36 is also adjacent to this driven abutment and under these conditions contact of the roller 36 with the driven abutment 33 will result in the roller 36 being forced radially inwardly relative to its carrier arms 66 into one or the other of these recesses 72 so as to avoid the roller 36 continuing to make intermittent contact with abutment 33 pending the stopping of driving element 21. Manually releasable spring means not shown may be provided for retaining roller 36 within each recess 72.

After the driving element 21 has been brought to rest re-engagement of the clutch is effected by manually rotating roller carrier 38 and driving element 21 into a position in which the carrier slot 66a is beneath that recess 72 which contains the roller 36, thus permitting of the latter being returned into the slot 66a whereupon the carrier is turned into a position in which in the direction of rotation 29 it is in advance of driving abutment 25 but behind driven abutment 33 and the parts are finally rotated manually into the relative position depicted in FIGURE 8 to effect re-engagement of the clutch. Such manual turning of the carrier 38 is facilitated by providing it with manual turning portion 73 as shown in FIGURE 7.

Although in each of the above described constructions the inner of the two clutch elements, namely element 21, has been referred to as the driving element with the outer element namely, element 23 described as the driven element it should be understood that in each construction the outer of the two elements may serve as the driving element and the inner of the two elements serving as the driven element.

Also in either construction where the torques required to be transmitted are small the rollers 36 may be replaced by balls.

What I claim then is:

1. A torque limiting clutch comprising:
   (a) driving and driven clutch elements;
   (b) means mounting said clutch elements for relative rotational movement about a common axis of rotation;
   (c) one of said clutch elements being formed as an outer shell with the other element being disposed therewithin;
   (d) a fulcrum member mounted on said inner element adjacent the periphery thereof and having at each of two opposite sides thereof oppositely directed fulcrum portions each of which is adapted for fulcrum engagement with said inner element;
   (e) opposed torque transmitting abutments on the inner periphery of said outer element and on the outer periphery of the fulcrum member;
   (f) a carrier member having a torque transmitting roller rotatable thereon;
   (g) means mounting said carrier member for angular movement relative to the two clutch elements between a driving position in which the roller on diametrically opposite sides thereof engages between the opposed torque transmitting abutments, and a clutch disengaged position in which the roller is out of engagement with said abutments;
   (h) spring means acting between the inner element and the fulcrum member to displace the latter in each of two opposite directions relative to the inner element about its respective two fulcrum portions towards the adjacent part of the outer element;
   (i) means limiting said outward movement of the fulcrum member; and
   (j) said roller in its driving position applying thrust to the torque transmitting abutment on the fulcrum member in a direction to displace the fulcrum member inwardly of the inner clutch element against said spring loading.

2. A torque limiting clutch according to claim 1, further characterised in that the carrier member is provided with an opening of slot-like configuration which in the direction of its length extends parallel to the clutch axis, the two sides of the slot-like opening being spaced relatively apart in a direction circumferentially of the axis of rotation of the clutch and between which two sides of the slot-like opening is disposed the torque transmitting roller, the distance between the two sides of the slot-like opening being slightly greater than the diameter of the roller so as effectively to locate the roller therebetween while permitting of the rotational movement of the roller about its own axis.

3. A torque limiting clutch according to claim 1 further characterised in that each fulcrum member is housed in a recess provided in the inner clutch element, the recess embodying a pair of convexedly curved corners spaced circumferentially apart and disposed adjacent the base of the recess, one or the other of oppositely directed fulcrum portions of the fulcrum member being adapted for fulcruming engagement with one or the other of the two recess corners.

4. A torque limiting clutch according to claim 1 further characterised in that the fulcrum member is provided with two loading springs disposed one adjacent each of the two fulcrum portions of the fulcrum member, each spring disposed adjacent one fulcrum portion being adapted to displace the fulcrum member about the fulcrum axis of the other of the two fulcrum portions into a torque transmitting engagement with the associated torque transmitting member.

5. A torque limiting clutch comprising:
 (a) driving and driven clutch elements;
 (b) means mounting said clutch elements for relative rotational movement about a common axis of rotation;
 (c) one of said clutch elements being formed as an outer shell with the other element being disposed therewithin;
 (d) a fulcrum member mounted on said inner element adjacent the periphery thereof with one end of said fulcrum member in fulcrum engagement with said inner element;
 (e) opposed torque transmitting abutments on the inner periphery of said outer element and on the outer periphery of the fulcrum member;
 (f) a carrier member having a torque transmitting roller rotatable thereon;
 (g) means mounting said carrier member for angular movement relative to the two clutch elements between a driving position in which the roller on diametrically opposite sides thereof engages between the opposed torque transmitting abutments, and a clutch disengaged position in which the roller is out of engagement with said abutments;
 (h) a spring acting between the inner element and the fulcrum member to displace the latter about its fulcrum outwardly on said inner element towards the adjacent part of the outer element;
 (i) means limiting said outward movement of the fulcrum member; and
 (j) said roller in its driving position applying thrust to the fulcrum member abutment in a direction to displace the fulcrum member inwardly of the inner clutch element against said spring loading.

6. A torque limiting clutch according to claim 5 wherein the inner of the two elements of the clutch constitutes the clutch driving element and the outer of the two elements of the clutch constitutes the driven element.

7. A torque limiting clutch according to claim 5 wherein in the fulcrum member abutment and the roller are so relatively disposed that the line of thrust of the roller on the fulcrum member abutment passes adjacent to the axis of fulcruming of said member but on the side of said axis nearest to the axis of rotation of the inner clutch element.

8. A torque limiting clutch according to claim 5 wherein the fulcrum member comprises a lever which on one of two opposite ends thereof fulcrums on the inner clutch element and the spring comprises a compression spring acting on the other of said two opposite ends of the fulcrum member lever, said fulcrum member abutment and roller being so relatively disposable that the line of thrust of the roller on the fulcrum member abutment is on the same side of the axis of fulcruming of the fulcrum member lever as that of the line of thrust of the spring on said lever but at a position nearer to said axis of fulcruming than the position of said thrust line of said spring.

9. A torque limiting clutch according to claim 5 wherein in the driving and driven clutch element abutments are of a convex configuration peripherally curved about mutually parallel axes parallel to the axis of curvature of the roller so as to be adapted to have torque transmitting engagement therewith on lines parallel to the roller axis but on diametrically opposite sides of said roller axis.

10. A torque limiting clutch comprising:
 (a) an outer shell-like rotatable clutch element having on its inner periphery a plurality of driving abutments spaced therearound;
 (b) a cylindrical inner clutch element rotatable within the outer clutch element;
 (c) said cylindrical inner element having a plurality of peripheral slots spaced circumferentially therearound;
 (d) a fulcrum lever within each slot and fulcruming at one end thereof on the inner element adjacent one side of each slot;
 (e) an inner clutch element driving abutment on the outer side of each fulcrum lever adjacent the inner periphery of the outer clutch element;
 (f) a plurality of torque transmitting rollers each engageable on diametrically opposite sides thereof between one of the driving abutments on the outer clutch element and one of the driving abutments on the fulcrum lever to displace the associated fulcrum lever inwardly in relation to its corresponding slot;
 (g) carrier means mounting each roller for angular movement relative to said inner clutch element from said torque transmitting position to a position in which the rollers are out of driving engagement with said abutments;
 (h) a compression spring acting between said inner element and each of said fulcrum levers to displace the latter outwardly of their associated slots in a direction to engage the associated abutment with one of said rollers; and
 (i) means for limiting the outward movement of each fulcrum lever under the loading of the associated compression spring.

11. A torque limiting clutch according to claim 10 wherein the cylindrical inner clutch element is of a disc-like configuration and each roller is mounted on the outer end of a pair of arms which extend one adjacent each end face of the disc-like element, and a pivot between the inner ends of each pair of arms and the inner clutch element.

12. A torque limiting clutch according to claim 10 wherein each torque transmitting roller is mounted on a corresponding carrier member, with means for releasably locking each carrier member in an angular position in which the associated roller is out of driving engagement with the inner and outer clutch element abutments.

13. A torque limiting clutch according to claim 12 wherein each roller carrier is pivotally mounted on the inner clutch element, each pivot comprising a pair of interengageable cam portions connected one to the inner clutch element and the other to the roller carrier, means mounting said cam portions so as to be axially shiftable towards one another along the axis of pivoting, spring means for effecting said relative axial movement, said cam members having interlocking cam faces registrable with one another when the carrier roller moves into the disengaged position, and each of said cam portion faces when interengaged with one another being adapted to restrain the associated roller carrier against movement about its axis of pivoting from said roller disengaged position.

References Cited by the Examiner

UNITED STATES PATENTS

| 1,562,442 | 11/25 | Evans. | |
| 1,883,225 | 10/32 | Wood | 192—56 |
| 2,425,736 | 8/47 | Hall | 192—56 |
| 2,948,373 | 8/60 | Schild | 192—56 |
| 2,997,149 | 8/61 | Seybold | 192—56 |

FOREIGN PATENTS

| 677,947 | 1/64 | Canada. |
| 41,754 | 1/33 | France. |

DON A. WAITE, *Primary Examiner.*

DAVID J. WILLIAMOWSKY, *Examiner.*